(12) United States Patent
Jang et al.

(10) Patent No.: US 12,052,414 B2
(45) Date of Patent: Jul. 30, 2024

(54) IMAGE ENCODING/DECODING METHOD AND APPARATUS USING QUANTIZATION MATRIX, AND METHOD FOR TRANSMITTING BITSTREAM

(71) Applicant: LG ELECTRONICS INC., Seoul (KR)

(72) Inventors: Hyeong Moon Jang, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 17/762,686

(22) PCT Filed: Sep. 23, 2020

(86) PCT No.: PCT/KR2020/012901
§ 371 (c)(1),
(2) Date: Mar. 22, 2022

(87) PCT Pub. No.: WO2021/060846
PCT Pub. Date: Apr. 1, 2021

(65) Prior Publication Data
US 2022/0345694 A1    Oct. 27, 2022

Related U.S. Application Data

(60) Provisional application No. 62/904,550, filed on Sep. 23, 2019.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11);
(Continued)

(58) Field of Classification Search
CPC .... H04N 19/70; H04N 19/176; H04N 19/124; H04N 19/61; H04N 19/44; H04N 19/159;
(Continued)

(56) References Cited

U.S. PATENT DOCUMENTS

| | | | |
|---|---|---|---|
| 2014/0079329 A1* | 3/2014 | Shibahara | H04N 19/44 382/233 |
| 2015/0043637 A1 | 2/2015 | Morigami et al. | |

(Continued)

FOREIGN PATENT DOCUMENTS

| | | | |
|---|---|---|---|
| JP | 2014-060713 A | 4/2014 | |
| JP | 2016-131384 A | 7/2016 | |

(Continued)

OTHER PUBLICATIONS

P. de Lagrange et al., "Non-CE7: Quantization matrices with single identifier and prediction from larger ones", Joint Video Experts Team (JVET) of ITU-T SG 16 WP 3 and ISO/IEC JTC 1/SC 29/WG 11, Jul. 3-12, 2019, JVET-O0223-v2.

*Primary Examiner* — Nathnael Aynalem
(74) *Attorney, Agent, or Firm* — Bryan Cave Leighton Paisner LLP

(57) ABSTRACT

An image encoding/decoding method and apparatus are provided. An image decoding method performed by an image decoding apparatus comprises obtaining quantization mode information for a current block from a bitstream, determining whether a quantization matrix for the current block is constructed from a reference quantization matrix, based on the quantization mode information, and constructing the quantization matrix for the current block, based on a result of determination. When the quantization matrix for the current block is constructed from the reference quantization matrix, the quantization matrix for the current block may be constructed based on identification information of the reference quantization matrix. When the quantization (Continued)

matrix for the current block is not constructed from the reference quantization matrix, the quantization matrix for the current block may be constructed based on a value of the quantization matrix obtained from the bitstream. When the current block is an intra-predicted chroma block, the quantization matrix for the current block may be constructed only when a size of the current block is greater than 2×2.

10 Claims, 17 Drawing Sheets

(51) Int. Cl.
  *H04N 19/176* (2014.01)
  *H04N 19/186* (2014.01)
  *H04N 19/46* (2014.01)
  *H04N 19/70* (2014.01)
(52) U.S. Cl.
  CPC ........... *H04N 19/186* (2014.11); *H04N 19/46* (2014.11); *H04N 19/70* (2014.11)
(58) Field of Classification Search
  CPC .... H04N 19/50; H04N 19/196; H04N 19/174; H04N 19/103; H04N 19/105; H04N 19/186; H04N 19/463; H04N 19/46; H04N 19/467

USPC ............................................. 375/240–240.29
  See application file for complete search history.

(56) References Cited

U.S. PATENT DOCUMENTS

| 2015/0078442 | A1* | 3/2015 | Lim | ........................ H04N 19/18 375/240.03 |
| 2015/0334396 | A1* | 11/2015 | Lim | ..................... H04N 19/126 375/240.03 |
| 2016/0050436 | A1* | 2/2016 | Liu | ....................... H04N 19/124 375/240.24 |
| 2016/0345016 | A1 | 11/2016 | Oh et al. | |
| 2017/0041610 | A1 | 2/2017 | Lim et al. | |
| 2018/0048905 | A1 | 2/2018 | Lim et al. | |

FOREIGN PATENT DOCUMENTS

| KR | 10-2014-0088100 A | 7/2014 |
| KR | 10-2018-0068919 A | 6/2018 |
| KR | 10-2018-0078212 A | 7/2018 |
| RU | 2595624 C2 | 8/2016 |

* cited by examiner

FIG. 5B
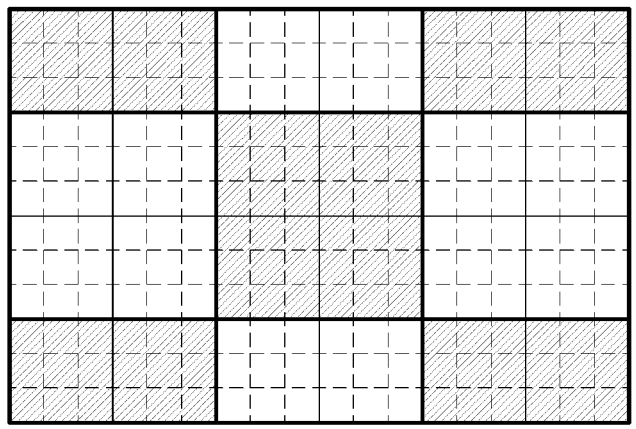
FIG. 5C
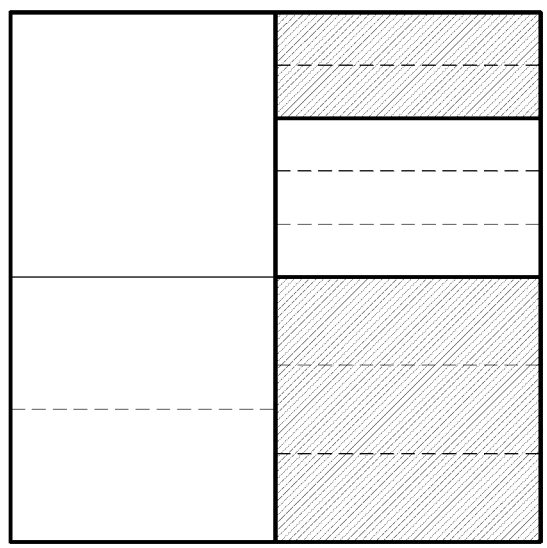
FIG. 6
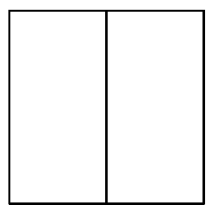
SPLIT_BT_VER
SPLIT_BT_HOR
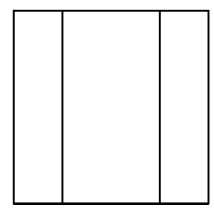
SPLIT_TT_VER
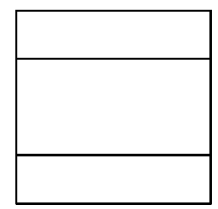
SPLIT_TT_HOR

| Size of quantization matrix | sizeId |
|---|---|
| 1x1 | 0 |
| 2x2 | 1 |
| 4x4 | 2 |
| 8x8 | 3 |
| 16x16 | 4 |
| 32x32 | 5 |
| 64x64 | 6 |

| sizeId | CuPredMode | cIdx<br>(Colour component) | matrixId |
|---|---|---|---|
| 2, 3, 4, 5, 6 | MODE_INTRA | 0 (Y) | 0 |
| 1, 2, 3, 4, 5, 6 | MODE_INTRA | 1 (Cb) | 1 |
| 1, 2, 3, 4, 5, 6 | MODE_INTRA | 2 (Cr) | 2 |
| 2, 3, 4, 5, 6 | MODE_INTER,<br>MODE_IBC | 0 (Y) | 3 |
| 1, 2, 3, 4, 5, 6 | MODE_INTER,<br>MODE_IBC | 1 (Cb) | 4 |
| 1, 2, 3, 4, 5, 6 | MODE_INTER,<br>MODE_IBC | 2 (Cr) | 5 |

FIG. 18

| scaling_list_data( ) { | Descriptor |
|---|---|
|   for( sizeId = 1; sizeId < 7; sizeId++ ) | |
|     for( matrixId = 0; matrixId < 6; matrixId ++ ) { | |
|       if( ! ( ( ( sizeId == 1 ) && ( matrixId % 3 == 0 ) ) \|\| | |
|         ( ( sizeId == 6 ) && ( matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if( !( sizeId == 6 && x >= 4 && y >= 4 ) ) { | |
|               scaling_list_delta_coef | se(v) |
|               nextCoef = ( nextCoef + scaling_list_delta_coef + 256 ) % 256 | |
|               ScalingList[ sizeId ][ matrixId ][ i ] = nextCoef | |
|             } | |
|           } | |
|         } | |
|       } | |
|     } | |
|   } | |
| } | |

1810 encompasses the for loops; 1820 marks the if condition.

FIG. 19

| sizeId | CuPredMode | cIdx (Colour component) | matrixId |
|---|---|---|---|
| 2, 3, 4, 5, 6 | MODE_INTRA | 0 (Y) | 0 |
| 2, 3, 4, 5, 6 | MODE_INTRA | 1 (Cb) | 1 |
| 2, 3, 4, 5, 6 | MODE_INTRA | 2 (Cr) | 2 |
| 2, 3, 4, 5, 6 | MODE_INTER, MODE_IBC | 0 (Y) | 3 |
| 2, 3, 4, 5, 6 | MODE_INTER, MODE_IBC | 1 (Cb) | 4 |
| 2, 3, 4, 5, 6 | MODE_INTER, MODE_IBC | 2 (Cr) | 5 |

FIG. 20

| | Descriptor |
|---|---|
| scaling_list_data( ) { | |
|   for( sizeId = 2; sizeId < 7; sizeId++ ) | |
|     for( matrixId = 0; matrixId < 6; matrixId ++ ) { | |
|       if( ! ( ( sizeId = = 6 ) && ( matrixId % 3 != 0 ) ) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else { | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !( sizeId = = 6 && x >= 4 && y >= 4 ) ) { | |
|               scaling_list_delta_coef | se(v) |
|               nextCoef = ( nextCoef + scaling_list_delta_coef + 256 ) % 256 | |
|               ScalingList[ sizeId ][ matrixId ][ i ] = nextCoef | |
|             } | |
|           } | |
|         } | |
|       } | |
|     } | |
|   } | |
| } | |

2010: for( sizeId = 2; sizeId < 7; sizeId++ ) / for( matrixId = 0; matrixId < 6; matrixId ++ ) {
2020: if( ! ( ( sizeId = = 6 ) && ( matrixId % 3 != 0 ) ) ) {

IMAGE ENCODING/DECODING METHOD AND APPARATUS USING QUANTIZATION MATRIX, AND METHOD FOR TRANSMITTING BITSTREAM

CROSS-REFERENCE TO PRIOR APPLICATIONS

This application is a National Stage of PCT/KR2020/012901, filed Sep. 23, 2020 (published on Apr. 1, 2021, as WO 2021/060846 A1), which claims priority to U.S. Provisional Application No. 62/904,550, filed Sep. 23, 2019, each hereby expressly incorporated by reference in its entirety.

TECHNICAL FIELD

The present disclosure relates to an image encoding/decoding method and apparatus and a method of transmitting a bitstream, and, more particularly, to an image encoding/decoding method and apparatus using a quantization matrix, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of efficiently signaling a quantization matrix.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining quantization mode information for a current block from a bitstream, determining whether a quantization matrix for the current block is constructed from a reference quantization matrix, based on the quantization mode information, and constructing the quantization matrix for the current block, based on a result of determination. Based on the quantization matrix for the current block being constructed from the reference quantization matrix, the quantization matrix for the current block may be constructed based on identification information of the reference quantization matrix. Based on the quantization matrix for the current block being not constructed from the reference quantization matrix, the quantization matrix for the current block may be constructed based on a value of the quantization matrix obtained from the bitstream. Based on the current block being an intra-predicted chroma block, the quantization matrix for the current block may be constructed only when a size of the current block is greater than 2×2.

An image decoding apparatus according to an aspect of the present disclosure may comprise a memory and at least one processor. The at least one processor may obtain quantization mode information for a current block from a bitstream, determine whether a quantization matrix for the current block is constructed from a reference quantization matrix, based on the quantization mode information, and construct the quantization matrix for the current block, based on a result of determination. Based on the quantization matrix for the current block being constructed from the reference quantization matrix, the quantization matrix for the current block may be constructed based on identification information of the reference quantization matrix. Based on the quantization matrix for the current block being not constructed from the reference quantization matrix, the quantization matrix for the current block may be constructed based on a value of the quantization matrix obtained from the bitstream. Based on the current block being an intra-predicted chroma block, the quantization matrix for the current block may be constructed only when a size of the current block is greater than 2×2.

An image encoding method performed by an image encoding apparatus according to an aspect of the present disclosure may comprise encoding quantization mode information for a current block from a bitstream, determining whether a quantization matrix for the current block is constructed from a reference quantization matrix, based on the quantization mode information, and encoding information on the quantization matrix for the current block based on a result of determination. Based on the quantization matrix for the current block being constructed from the reference quantization matrix, identification information of the reference quantization matrix may be encoded. Based on the quantization matrix for the current block being not constructed from the reference quantization matrix, a value of the quantization matrix for the current block may be encoded. Based on the current block being an intra-predicted chroma block, the quantization matrix for the current block may be constructed only when a size of the current block is greater than 2×2.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of encoding/decoding only a quantization matrix having a size greater than a predetermined size.

Also, according to the present disclosure, it is possible to provide an image encoding/decoding method and apparatus capable of differently constructing a quantization matrix according to a prediction mode of a current block and a color component.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 5A to 5C are views illustrating partitioning examples of a picture.

FIG. 6 is a view showing an embodiment of a partitioning type of a block according to a multi-type tree structure.

FIG. 18 is a view illustrating an example of syntax for performing an encoding method of a quantization matrix based on the example of FIG. 16.

FIG. 19 is a view illustrating an example of a quantization matrix for a current block according to an embodiment of the present disclosure.

FIG. 20 is a view illustrating an example of syntax for performing the encoding method of the quantization matrix based on the example of FIG. 19.

MODE FOR INVENTION

Figure 1:
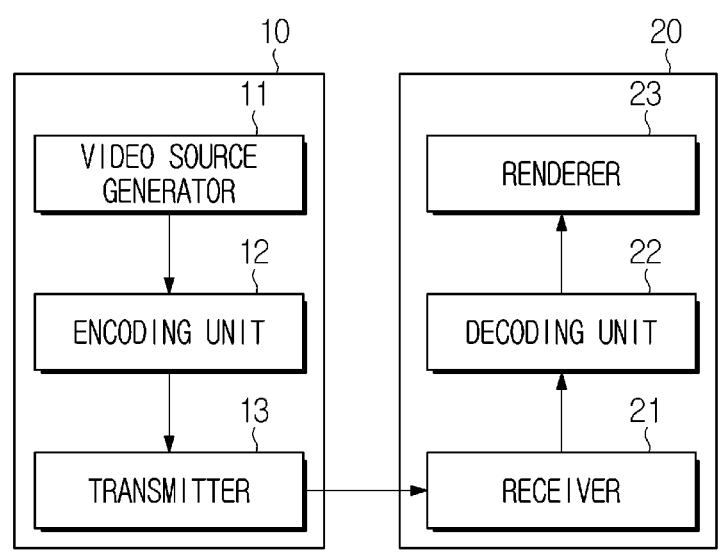
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
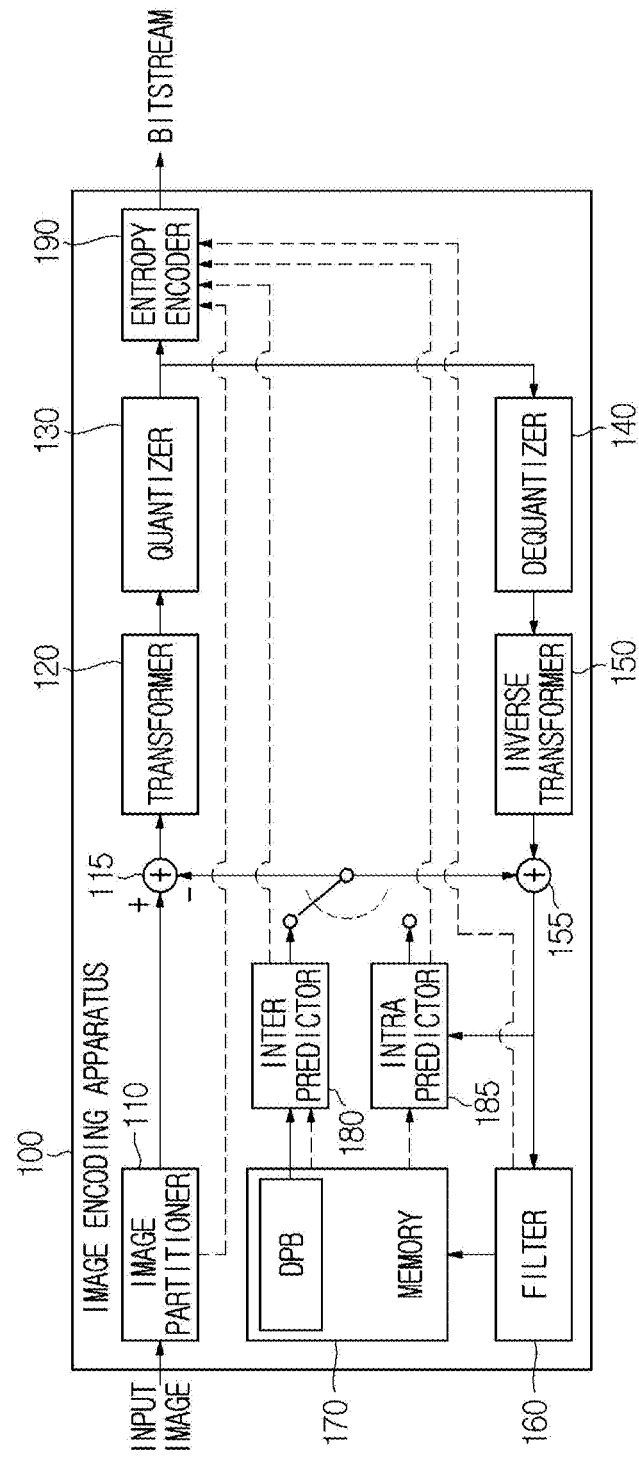
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
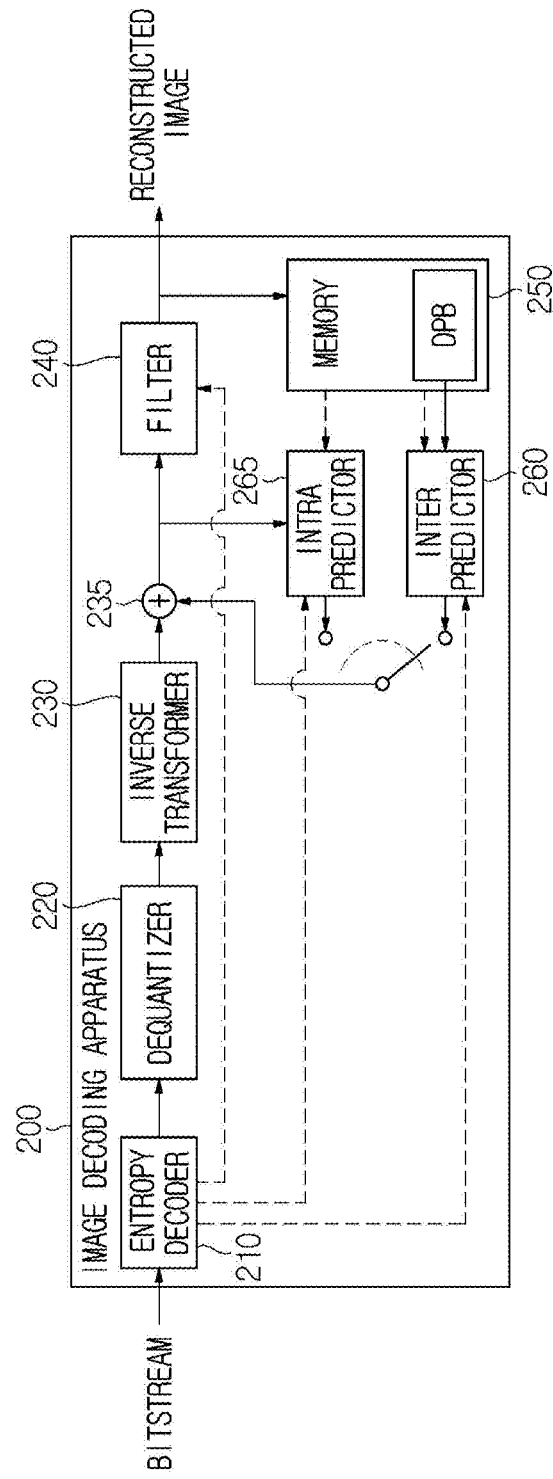
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than maxTbSize, a plurality of TUs (TBs) of maxTbSize may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs, as described above. The tile may consist of a rectangular region including CTUs assembled in a specific row and a specific column in a picture. The tile group may include an integer number of tiles according to tile-raster scan. A tile group header may signal information/parameters applicable to a corresponding tile group. When an encoding/decoding apparatus has a multi-core processor, an encoding/decoding procedure for the tile or tile group may be performed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signalled without prediction. For blocks in the P tile group, intra prediction or inter prediction may be used, and only uni-prediction may be used when inter prediction. Meanwhile, for blocks in the B tile group, intra prediction or inter prediction may be used, and up to bi prediction may be used when inter prediction is used.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoding apparatus, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

Partitioning Structure

Figure 4:
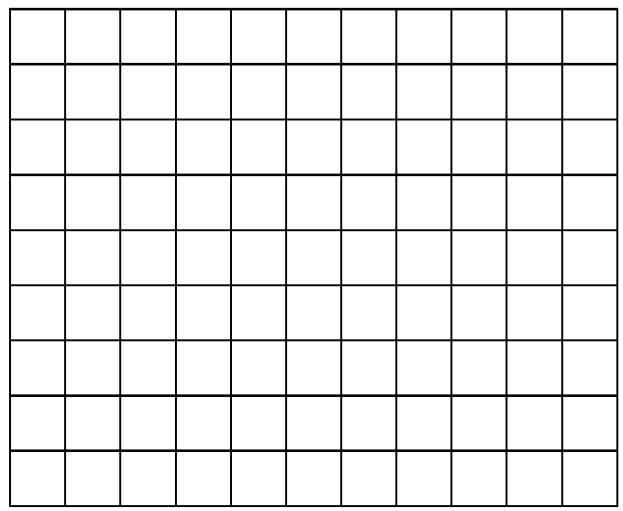
FIG. 4 is a view showing a partitioning structure of an image according to an embodiment.

Pictures may be partitioned into a sequence of coding tree units (CTUs). The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. FIG. 4 shows an example in which a picture is partitioned into CTUs.

A maximum allowable size of a CTU for coding and prediction may be different from that of a CTU for transform. For example, even when a maximum size of a luma block in the CTU for transform is 64×64, a maximum size of a luma block for the CTU for coding and prediction may be 128×128.

In addition, a picture may be partitioned into one or more tile rows and one or more tile columns. A tile may be a sequence of CTUs covering a rectangular region in a picture.

A tile may be partitioned into one or more bricks, and each brick may consist of a plurality of CTU rows in a tile. In the present disclosure, a tile which is not partitioned into a plurality of bricks may be referred to as a brick.

A slice may include a plurality of tiles in a picture or a plurality of bricks in a tile. Two modes of a slice may be supported. One may be a raster scan slice mode and the other may be a rectangular slice mode.

In the raster slice mode, a slice may include a plurality of consecutive tiles within a picture according to a raster scan order. In the present disclosure, a slice according to the raster scan slice mode may be referred to as a raster scan slice.

In the rectangular slice mode, a slice may include a plurality of bricks constructing a rectangular region within a picture. In the present disclosure, a slice according to the rectangular slice mode may be referred to as a rectangular slice. A plurality of bricks included in the rectangular slice may exist according to the brick raster scan order of the slice.

Figure 5A:
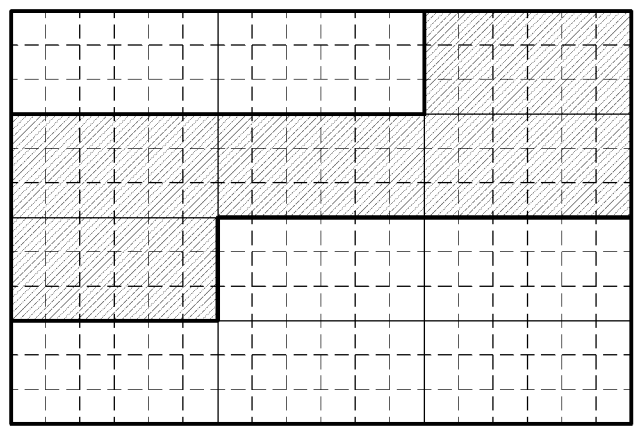

FIGS. 5A to 5C are views illustrating partitioning examples of a picture.

First, referring to FIG. 5A, in the raster scan slice mode, ap picture may be partitioned into 12 tiles and three raster scan slices.

Referring to FIG. 5B, in the rectangular slice mode, a picture may be partitioned into 24 tiles (that is, six tile rows and four tile columns) and nine rectangular slices.

Referring to FIG. 5C, a picture may be partitioned into four tiles (that is, two tile rows and two tile columns), 11 bricks (that is, one top-left brick, five top-right bricks, two bottom-left bricks and three bottom-right bricks) and four rectangular slices.

Overview of Partitioning of CTU

As described above, the coding unit (CU) may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 6 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 5, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 7:
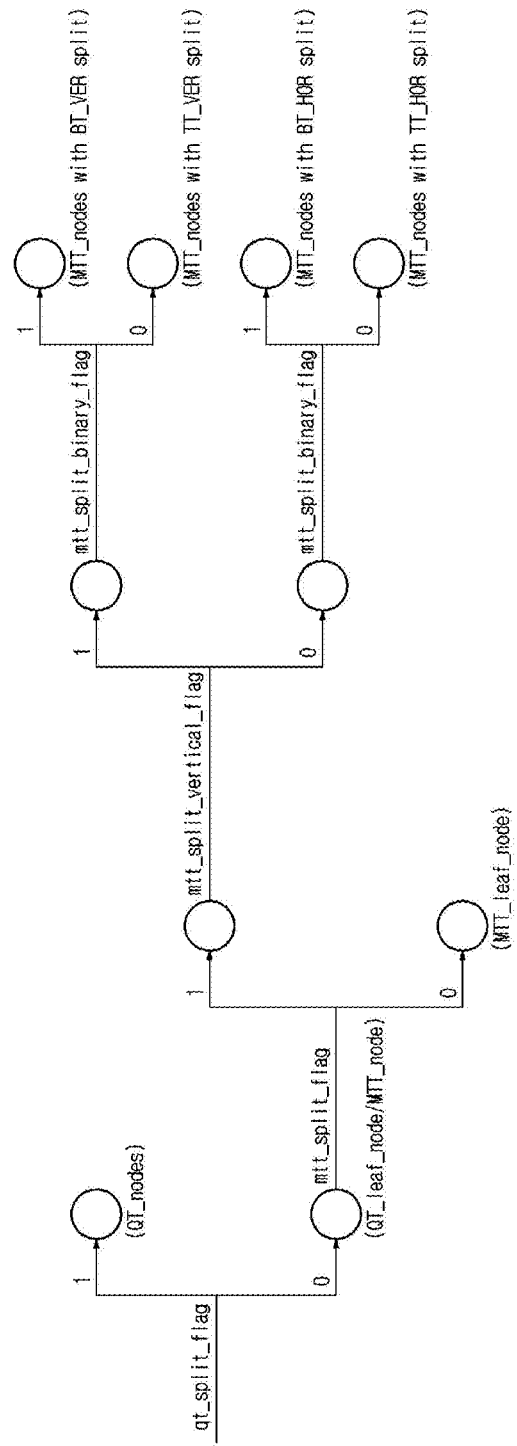
FIG. 7 is a view showing a signaling mechanism of block splitting information in a quadtree with nested multi-type tree structure according to the present disclosure.

FIG. 7 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT leaf node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 8:
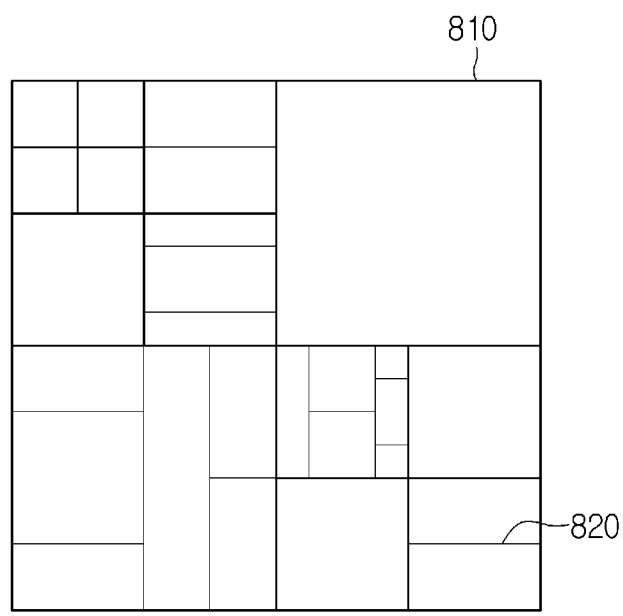
FIG. 8 is a view showing an example in which a CTU is partitioned into multiple CUs by applying a multi-type tree after applying a quadtree.

FIG. 8 is a view showing an example in which a CTU is partitioned into multiple CUs by applying a multi-type tree after applying a quadtree. In FIG. 8, bold block edges 810 represent quadtree partitioning and the remaining edges 820 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT split type) including information on how many blocks the leaf node of the QT structure is partitioned into and a syntax element (ex. MPT split mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

When a portion of a tree node block exceeds a bottom picture boundary and/or a right picture boundary of a picture, the corresponding tree node block may be restricted such that samples in all coded CUs are located in the picture boundaries. In this case, for example, the following split rules may apply.

Split rule 1: As the case where a portion of the tree node block exceeds both the bottom picture boundary and the right picture boundary, when the tree node block is a QT node having a size greater than a minimum QT size, the tree node block may be split in a QT split mode and, when the tree node block has a size equal to or less than the minimum QT size or is not a QT node, the tree node block is split in a horizontal binary split mode SPLIT_BT_HOR mode.

Split rule 2: As the case where split rule 1 is not satisfied and a portion of the tree node block exceeds the bottom picture boundary, the tree node block is split in a QT split mode when the tree node block is a QT node having a size greater than a minimum QT size and a maximum BT size, and the tree node block is split in a horizontal binary split mode when the tree node block is a BTT node having a size equal to or less than the minimum QT size.

Split rule 3: As the case where split rule 1 and split rule 2 are not satisfied and a portion of the tree node block exceeds the right picture boundary, the tree node block is split in a QT split mode when the tree node block is a QT node having a size greater than a minimum QT size and a maximum BT size, and the tree node block is split in a QT split mode or horizontal binary split mode when the tree node block has a size greater than the minimum QT size and equal to or less than the maximum BT size. Alternatively, when the tree node block is a BTT node or has a size equal to or less than the minimum QT size, the tree node block is split in a horizontal binary split mode.

As described above, the quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 9:
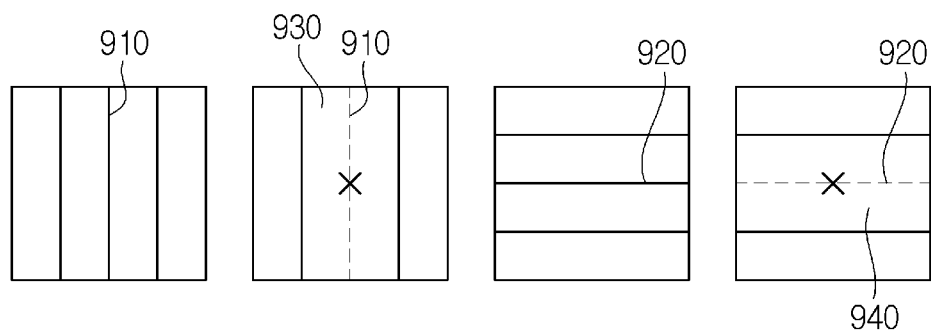
FIG. 9 shows redundant splitting patterns which may occur in binary tree splitting and ternary tree splitting.

For example, FIG. 9 shows redundant splitting patterns which may occur in binary tree splitting and ternary tree splitting. As shown in FIG. 9, continuous binary splitting 910 and 920 for one direction of two-step levels have the same coding block structure as binary splitting for a center partition after ternary splitting. In this case, binary tree splitting for center blocks 930 and 940 of ternary tree splitting may be prohibited, this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 9, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Virtual Pipeline Data Unit

Virtual pipeline data units (VPDUs) may be defined for pipeline processing within a picture. The VPDUs may be defined as non-overlapping units within one picture. In a decoding apparatus, successive VPDUs may be simultaneously processed by multiple pipeline stages. In most pipeline stages, a VPDU size may be roughly proportional to a buffer size. Accordingly, keeping the VPDU size small is important when considering the buffer size from a point of view of hardware. In most decoding apparatuses, the VPDU size may be set equal to a maximum transform block (TB) size. For example, the VPDU size may be 64×64 (64×64 luma samples) size. In addition, the VPDU size may be changed (increased or decreased) in consideration of the above-described ternary tree (TT) and/or binary tree (BT) split.

Meanwhile, to keep the VPDU size at 64×64, at least one of the following restrictions may be applied.

Restriction 1: Ternary tree splitting for a CU having at least one of a width or height of 128 is not allowed.

Restriction 2: Horizontal binary tree splitting for a CU having a width of 128 and a height of 64 or less (i.e. 128×N CU with N≤64) is not allowed.

Restriction 3: Vertical binary tree splitting for a CU having a width of 64 or less or a height of 128 (i.e. N×128 CU with N≤64) is not allowed.

Figure 10:
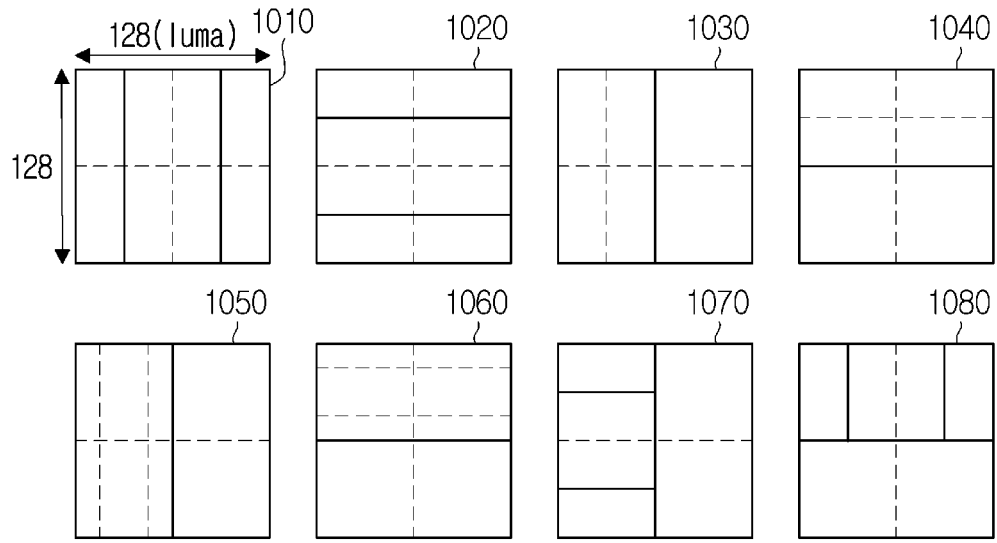
FIG. 10 is a view illustrating examples in which CU splitting is restricted.

Splitting examples of a CU now allowed under the above restrictions are shown in FIG. 10. In FIG. 10, bold solid lines denote block split and the remaining solid lines denote CUs.

Referring to FIG. 10, according to Restriction 1, vertical ternary tree splitting for a 128×128 CU 1010 is not allowed. In addition, according to Restriction 1, horizontal ternary tree splitting for a 128×128 CU 1020 is not allowed. In addition, according to Restriction 3, vertical binary tree splitting for a 64×128 CU 1030 is not allowed. In addition, according to Restriction 2, horizontal binary tree splitting for a 128×64 CU 1040 is not allowed. In addition, according to Restriction 1, vertical ternary tree splitting for a 64×128 CU 1050 is not allowed. In addition, according to Restriction 1, horizontal ternary tree splitting for a 128×64 CU 1060 is not allowed. In addition, according to Restriction 1, horizontal ternary splitting for a 64×128 CU 1070 is not allowed. In addition, according to Restriction 1, vertical ternary splitting for a 128×64 CU 1080 is not allowed.

Meanwhile, in a dual tree within an intra picture, different partitioning structures may apply to a luma coding tree and a chroma coding tree. In the dual tree, a longer coding pipeline may be introduced, and in the chroma coding tree, a chroma block having a small size such as 2×2, 4×2 and 2×4 may be allowed according to a range of a QTBT MinQTSizeC value, MinBtSizeY, and MinTTSizeY. However, this may make it difficult to design a practical decoding apparatus. In addition, a multiplication operation is required in a cross-component linear model (CCLM) mode, a planar mode, an angular mode, etc. In order to solve the above-described issues, in the dual tree, a chroma block having a small size such as 2×2, 4×2 and 2×4 may be restricted through partitioning restrictions.

Overview of Quantization/Dequantization

Hereinafter, quantization/dequantization according to the present disclosure will be described.

As described above, a quantization unit of an encoding apparatus may derive quantized transform coefficients by applying quantization to transform coefficients, and a dequantization unit of an encoding apparatus or a dequantization unit of a decoding apparatus may derive transform coefficients by applying dequantization to quantized transform coefficients.

In general, in video/image coding, a quantization rate may be changed, and a compression rate may be adjusted using the changed quantization rate. From the implementation point of view, a quantization parameter (QP) may be used instead of directly using the quantization rate in consideration of complexity. For example, a quantization parameter of an integer value from 0 to 63 may be used, and the value of each quantization parameter may correspond to an actual quantization rate. A quantization parameter $QP_Y$ for a luma component (luma sample) may be set to a value different from that of a quantization parameter $QP_C$ for a chroma component (chroma sample).

In a quantization process, a transform coefficient C may be received as input and divided by quantization rate Qstep, thereby deriving a quantized transform coefficient C'. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. By applying the quantization scale to the transform coefficient C, the quantized transform coefficient C' may be derived based on this.

A dequantization process is an inverse process of the quantization process, and the quantized transform coefficient C' may be multiplied by the quantization rate Qstep, thereby deriving a reconstructed transform coefficient C". In this case, a level scale may be derived according to the quantization parameter and the level scale may be applied to the quantized transform coefficient C', thereby deriving a reconstructed transform coefficient C". The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may apply. The adaptive frequency weighting quantization technology is a method of differently applying a quantization strength according to the frequency. In adaptive frequency weighting quantization, the quantization strength may differently apply according to the frequency using a predefined quantization scaling matrix. That is, the above-described quantization/dequantization process may be performed further based on the quantization scaling matrix. For example, a different quantization scaling matrix may be used according to a size of a current block and/or whether a prediction mode applying to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data. Based on the scaling list data, the (modified) quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Overview of Inter Prediction

Hereinafter, inter prediction according to the present disclosure will be described.

The prediction unit of an image encoding apparatus/image decoding apparatus according to the present disclosure may perform inter prediction in units of blocks to derive a prediction sample. Inter prediction may represent prediction derived in a manner that is dependent on data elements (e.g., sample values, motion information, etc.) of picture(s) other than a current picture. When inter prediction applies to the current block, a predicted block (prediction block or a prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU) or colBlock, and the reference picture including the temporal neighboring block may be referred to as a collocated picture (colPic) or colPicture. For example, a motion information candidate list may be constructed based on the neighboring blocks of the current block, and flag or index information specifying which candidate is selected (used) may be signaled in order to derive the motion vector of the current block and/or the reference picture index.

Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference. In the present disclosure, the MVP mode may have the same meaning as advanced motion vector prediction (AMVP).

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may specify a motion vector associated with a reference picture list L0 (L0) and the L1 motion vector may specify a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 11:
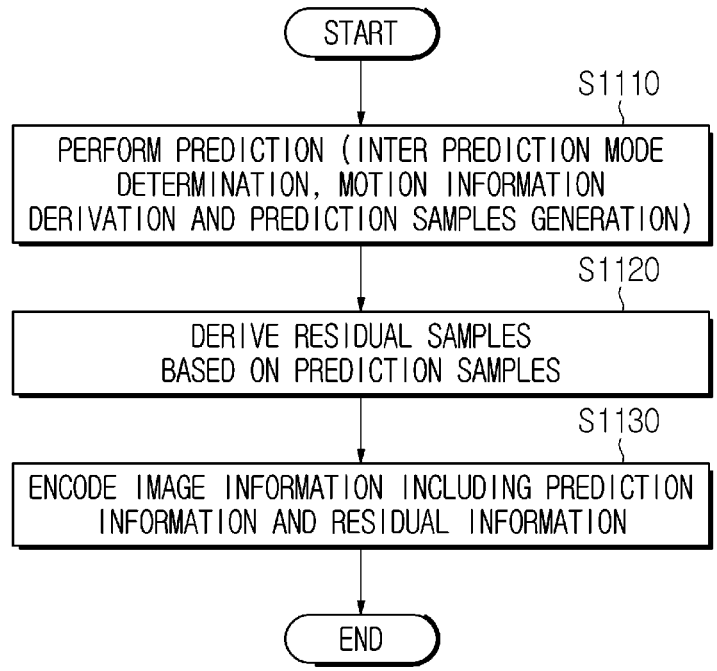
FIG. 11 is a flowchart illustrating an inter prediction based video/image encoding method.

FIG. 11 is a flowchart illustrating an inter prediction based video/image encoding method.

Figure 12:
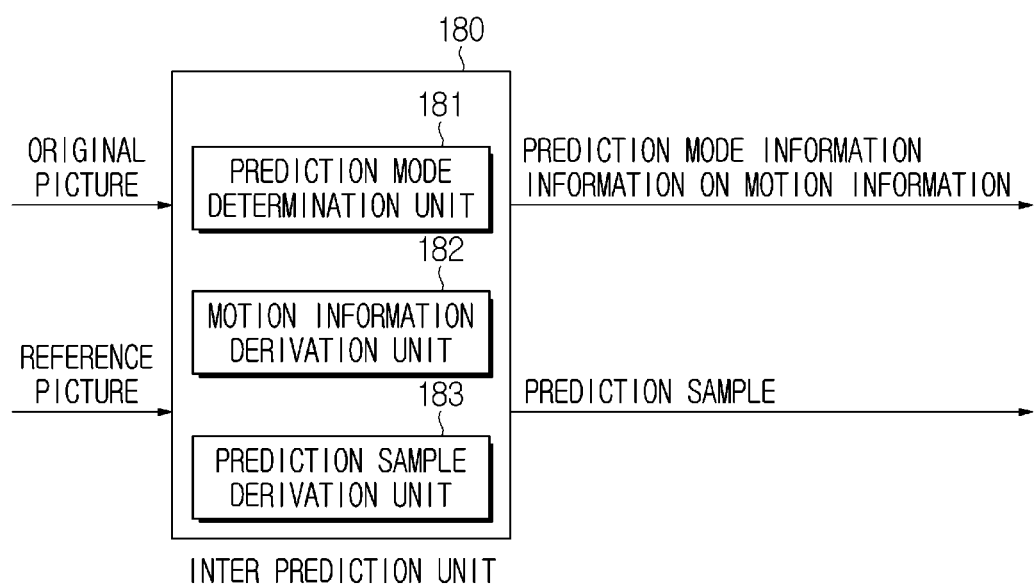
FIG. 12 is a view illustrating the configuration of an inter prediction unit 180 according to the present disclosure.

FIG. 12 is a view illustrating the configuration of an inter prediction unit 180 according to the present disclosure.

The encoding method of FIG. 11 may be performed by the image encoding apparatus of FIG. 2. Specifically, step S1110 may be performed by the inter prediction unit 180, and step S1120 may be performed by the residual processor. Specifically, step S1120 may be performed by the subtractor 115. Step S630 may be performed by the entropy encoder 190. The prediction information of step S1130 may be derived by the inter prediction unit 180, and the residual information of step S1130 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficients may be derived as quantized transform coefficients through the quantizer 130. Information on the quantized transform coefficients may be encoded by the entropy encoder 190 through a residual coding procedure.

The image encoding apparatus may perform inter prediction on a current block (S1110). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 12, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose a difference from the current block is equal to or less than a predetermined criterion or a minimum. Based on this, a reference picture index specifying a reference picture in which the reference block is located may be derived, and a motion vector may be derived based on a position difference between the reference block and the current block. The image encoding apparatus may determine a mode applying to the current block among various prediction modes. The image encoding apparatus may compare rate-distortion (RD) costs for the various prediction modes and determine an optimal prediction mode of the current block. However, the method of determining the prediction mode of the current block by the image encoding apparatus is not limited to the above example, and various methods may be used.

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose a difference from the current block is equal to or less than a predetermined criterion or a minimum, among reference blocks specified by merge candidates included in the merge candidate list. In this case, a merge candidate associated with the derived reference block may be selected, and merge index information specifying the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, index information specifying the selected mvp candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S1120). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S1130). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag specifies whether a skip mode applies to the current block, and the merge flag specifies whether the merge mode applies to the current block. Alternatively, the prediction mode information may specify one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the mvp flag or the mvp index may be signaled when the MVP mode applies to the current block and may be information for selecting one of mvp candidates in an mvp candidate list. In addition, the information on the motion information may include information on the above-described MVD and/or reference picture index information. In addition, the information on the motion information may include information specifying whether to apply L0 prediction, L1 prediction or Bi prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 13:
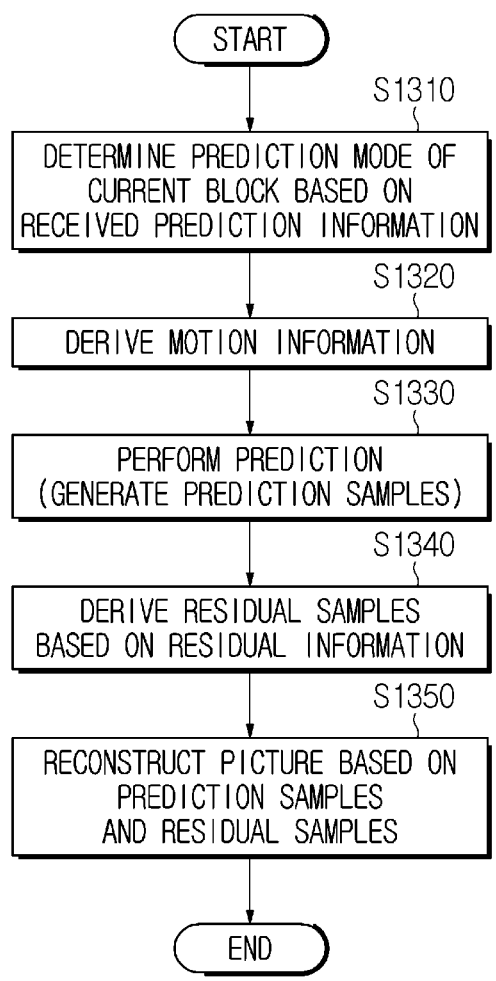
FIG. 13 is a flowchart illustrating an inter prediction based video/image decoding method.

FIG. 13 is a flowchart illustrating an inter prediction based video/image decoding method.

Figures 14, 15:
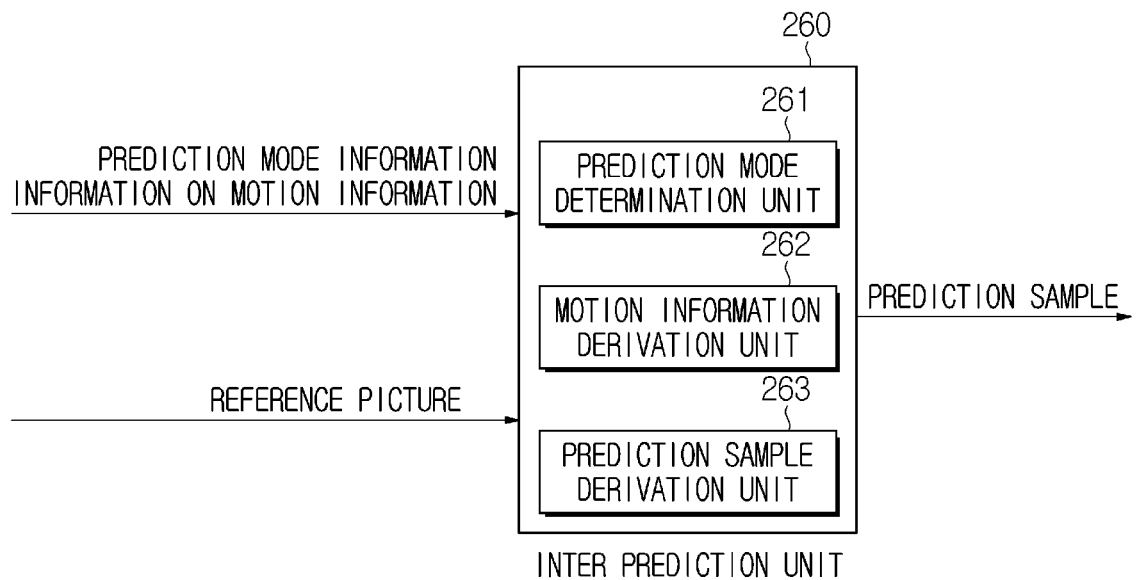
FIG. 14 is a view illustrating the configuration of an inter prediction unit 260 according to the present disclosure.
FIG. 15 is a view illustrating an example of sizeId for each size of a quantization matrix.

FIG. 14 is a view illustrating the configuration of an inter prediction unit 260 according to the present disclosure.

The image decoding apparatus may perform operation corresponding to operation performed by the image encoding apparatus. The image decoding apparatus may perform prediction on a current block based on received prediction information and derive prediction samples.

The decoding method of FIG. 13 may be performed by the image decoding apparatus of FIG. 3. Steps S1310 to S1330 may be performed by the inter prediction unit 260, and the prediction information of step S1310 and the residual information of step S1340 may be obtained from a bitstream by the entropy decoder 210. The residual processor of the image decoding apparatus may derive residual samples for a current block based on the residual information (S1340). Specifically, the dequantizer 220 of the residual processor may perform dequantization based on dequantized transform coefficients derived based on the residual information to derive transform coefficients, and the inverse transformer 230 of the residual processor may perform inverse transform on the transform coefficients to derive the residual samples for the current block. Step S1350 may be performed by the adder 235 or the reconstructor.

Specifically, the image decoding apparatus may determine the prediction mode of the current block based on the received prediction information (S1310). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S1320). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an mvp candidate list and use the motion vector of an mvp candidate selected from among mvp candidates included in the mvp candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S1330). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed on all or some of the prediction samples of the current block.

For example, as shown in FIG. 14, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S1340). The image decoding apparatus may generate the reconstructed samples of the current block based on the prediction samples and the residual samples and generate a reconstructed picture based on this (S1350). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Overview of Intra Block Copy (IBC) Prediction

Hereinafter, IBC prediction according to the present disclosure will be described.

IBC prediction may be performed by a prediction unit of an image encoding/decoding apparatus. IBC prediction may be simply referred to as IBC. The IBC may be used for content image/moving image coding such as screen content coding (SCC). The IBC prediction may be basically performed in the current picture, but may be performed similarly to inter prediction in that a reference block is derived within the current picture. That is, IBC may use at least one of inter prediction techniques described in the present disclosure. For example, IBC may use at least one of the above-described motion information (motion vector) derivation methods. At least one of the inter prediction techniques may be partially modified and used in consideration of the IBC prediction. The IBC may refer to a current picture and thus may be referred to as current picture referencing (CPR).

For IBC, the image encoding apparatus may perform block matching (BM) and derive an optimal block vector (or motion vector) for a current block (e.g., a CU). The derived block vector (or motion vector) may be signaled to the image decoding apparatus through a bitstream using a method similar to signaling of motion information (motion vector) in the above-described inter prediction. The image decoding apparatus may derive a reference block for the current block in the current picture through the signaled block vector (motion vector), and derive a prediction signal (predicted block or prediction samples) for the current block through this. Here, the block vector (or motion vector) may specify displacement from the current block to a reference block located in an already reconstructed area in the current picture. Accordingly, the block vector (or the motion vector) may be referred to a displacement vector. Hereinafter, in IBC, the motion vector may correspond to the block vector or the displacement vector. In addition, in IBC, a motion vector difference (MVD) may also be called a block vector difference (BVD). The motion vector of the current block may include a motion vector (luma motion vector) for a luma component or a motion vector (chroma motion vector) for a chroma component. For example, the luma motion vector for an IBC-coded CU may be an integer sample unit (that is, integer precision). The chroma motion vector may be clipped in integer sample units. As described above, IBC may use at least one of inter prediction techniques, and, for example, when IBC applies like AMVR, 1-pel and 4-pel motion vector precision may be switched.

In IBC, a reference block is derived from the already reconstructed area in the current picture. In this case, in order to reduce memory consumption and complexity of the image decoding apparatus, only a predefined area among already reconstructed areas in the current picture may be referenced. The predefined area may include a current CTU in which the current block is included. By restricting referenceable reconstructed area to the predefined area, the IBC mode may be implemented in hardware using a local on-chip memory.

The image encoding apparatus for performing IBC may search the predefined area to determine a reference block with smallest RD cost and derive a motion vector (block vector) based on the positions of the reference block and the current block.

Whether to apply IBC to the current block may be signaled as IBC performance information at a CU level. Information on a signaling method (IBC MVP mode or IBC skip/merger mode) of the motion vector of the current block may be signaled. IBC performance information may be used to determine the prediction mode of the current block. Accordingly, the IBC performance information may be included in information on the prediction mode of the current block.

In the case of the IBC skip/merge mode, a merge candidate index may be signaled to specify a block vector to be used for prediction of the current luma block among block vectors included in the merge candidate list. In this case, the merge candidate list may include IBC-encoded neighboring blocks. The merge candidate list may be configured to include spatial merge candidates and not to include temporal merge candidates. In addition, the merge candidate list may further include history-based motion vector predictor (HMVP) candidates and/or pairwise candidates.

In the case of the IBC MVP mode, a block vector difference value may be encoded using the same method as a motion vector difference value of the above-described inter mode. The block vector prediction method may construct and use an mvp candidate list including two candidates as predictors similarly to the MVP mode of the inter mode. One of the two candidates may be derived from a left neighboring block and the other candidate may be derived from a top neighboring block. In this case, only when the left or top neighboring block is IBC-encoded, candidates may be derived from the corresponding neighboring block. If the left or top neighboring block is not available, for example, is not IBC-encoded, a default block vector may be included in the mvp candidate list as a predictor. In addition, information (e.g., flag) specifying one of two block vector predictors is signaled and used as candidate selection information similarly to the MVP mode of the inter mode. The mvp candidate list may include an HMVP candidate and/or a zero motion vector as the default block vector.

The HMVP candidate may be referred to as a history-based MVP candidate, and an MVP candidate used before encoding/decoding of the current block, a merge candidate or a block vector candidate may be stored in an HMVP list as HMVP candidates. Thereafter, when the merge candidate list of the current block or the mvp candidate list does not include a maximum number of candidates, candidates stored in the HMVP list may be added to the merge candidate list or mvp candidate list of the current block as HMVP candidates.

The pairwise candidate may mean a candidate derived by selecting two candidates according to a predetermined order from among candidates already included in the merge candidate list of the current block and averaging the selected two candidates.

Embodiment

Hereinafter, embodiments of the present disclosure will be described in detail with reference to the accompanying drawings.

In a quantization/dequantization process for a current block, a quantization matrix may be constructed. An image encoding/decoding apparatus may quantize/dequantize transform coefficients of the current block using the quantization matrix. The quantization matrix may be referred to as a scaling list. In addition, one or more quantization matrix coefficients included in the quantization matrix may be referred to as scaling list data.

In an example, the quantization matrix may have the same size as the current block. For example, when the size of the current block is 4×4, the size of the quantization matrix for the current block may also be 4×4. The size of the quantization matrix may be specified using a predetermined size identifier (e.g., sizeId). FIG. 15 is a view illustrating an example of sizeId for each size of a quantization matrix.

Referring to FIG. 15, the value of sizeId for a 1×1 quantization matrix may be 0, and the value of sizeId for a 2×2 quantization matrix may be 1. In addition, the value of sizeId for a 4×4 quantization matrix may be 2, and the value of sizeId for an 8×8 quantization matrix may be 3. In addition, the value of sizeId for a 16×16 quantization matrix may be 4, and the value of sizeId for a 32×32 quantization matrix may be 5. In addition, the value of sizeId for a 64×64 quantization matrix may be 6. In an example, the size of the quantization matrix may be changed (increased or decreased) in the encoding process.

Figures 16, 17:
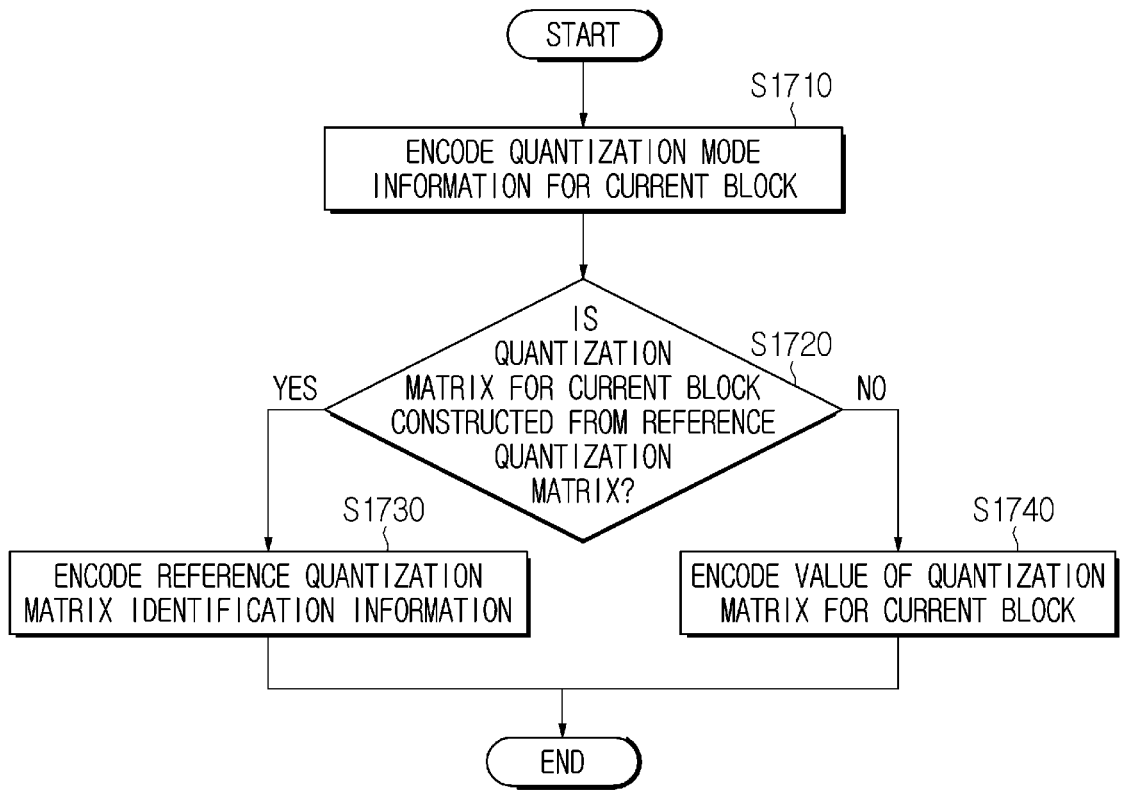
FIG. 16 is a view illustrating an example of a quantization matrix for a current block constructed based on the example of FIG. 15.
FIG. 17 is a flowchart illustrating a method of encoding a quantization matrix according to an embodiment of the present disclosure.

In an example, the quantization matrix may be differently constructed according to the size (e.g., sizeId) of the quantization matrix, a prediction mode (e.g., an intra prediction mode, an inter prediction mode, etc.) of the current block and a color component (e.g., Y, Cb, Cr). FIG. 16 is a view illustrating an example of a quantization matrix for a current block constructed based on the example of FIG. 15.

Referring to FIG. 16, an image encoding apparatus may construct first to sixth quantization matrices matrixId=0 to matrixId=5 having various sizes sizeId based on the prediction mode CuPredMode of the current block and the color component cIdx.

Specifically, for a luma component (cIdx=0)(e.g., Y) in the current block encoded using an intra prediction mode, a first quantization matrix (matrixId=0) may be constructed. In this case, the size of the first quantization matrix may be equal to or greater than 2×2 and equal to or less than 64×64 (that is, 2≤sizeId≤6). In addition, for a first chroma component (cIdx=1)(e.g., Cb) in the current block encoded using an intra prediction mode, a second quantization matrix (matrixId=1) may be constructed. In this case, the size of the second quantization matrix may be equal to or greater than 1×1 and equal to or less than 64×64 (that is, 1≤sizeId≤6). In addition, for a second chroma component (cIdx=2)(e.g., Cr) in the current block encoded using an intra prediction mode, a third quantization matrix (matrixId=2) may be constructed. In this case, the size of the third quantization matrix is equal to or greater than 1×1 and equal to or less than 64×64 (that is, 1≤sizeId≤6). In addition, for a luma component (cIdx=0) in the current block encoded using an inter prediction mode or an inter block copy (IBC) mode, a fourth quantization matrix (matrixId=3) may be constructed. In this case, the size of the fourth quantization matrix may be equal to or greater than 2×2 and equal to or less than 64×64 (that is, 2≤sizeId≤6). In addition, for a first chroma component (cIdx=1) in the current block encoded using an inter prediction mode or an IBC mode, a fifth quantization matrix (matrixId=4) may be constructed. In this case, the size of the fifth quantization matrix may be equal to or greater than 1×1 and equal to or less than 64×64 (that is, 1≤sizeId≤6). In addition, for a second chroma component (cIdx=2) in the current block encoded using an inter prediction mode or an IBC mode, a sixth quantization matrix (matrixId=5) may be constructed. In this case, the size of the fifth quantization matrix may be equal to or greater than 1×1 and equal to or less than 64×64 (that is, 1≤sizeId≤6).

In the examples of FIGS. 15 and 16, the quantization matrix for the current block may be specified by a size identifier (e.g., sizeId) and a quantization matrix identifier (e.g., matrixId).

Meanwhile, the image encoding apparatus may encode a quantization matrix for a current block and signal it to the image decoding apparatus. For example, the image encoding apparatus may encode a quantization matrix coefficient included in the quantization matrix or encode an identifier of a reference quantization matrix corresponding to the quantization matrix and signal it to the image decoding apparatus. Hereinafter, a method of encoding a quantization matrix will be described in detail.

FIG. 17 is a flowchart illustrating a method of encoding a quantization matrix according to an embodiment of the present disclosure. The encoding method of FIG. 17 may be performed by the image encoding apparatus of FIG. 2. Specifically, steps S1710 to S1740 may be performed by the quantization unit 130 and/or the dequantization unit 140.

Referring to FIG. 17, the image encoding apparatus may encode quantization mode information of a method of constructing the quantization matrix for the current block (S1710).

In an example, the quantization mode information may include first mode information specifying whether the quantization matrix is constructed based on the reference quantization matrix. The first mode information may be encoded using a predetermined flag. For example, the first mode information may be encoded using scaling_list_pred_mode_flag. In this case, a first value (e.g., 0) of scaling_list_pred_mode_flag may specify that the quantization matrix for the current block is the same as the reference quantization matrix. Here, reference quantization matrix may be specified using reference quantization matrix identification information (e.g., scaling_list_pred_matrix_id_delta). In contrast, a second value (e.g., 1) of scaling_list_pred_mode_flag may specify that the quantization matrix for the current block is not the same as the reference quantization matrix. When scaling_list_pred_mode_flag has a second value, the value of the quantization matrix for the current block may be explicitly signaled.

In another example, the quantization mode information may include first mode information and second mode information.

The first mode information may specify that the quantization matrix is configured to be same as the reference quantization matrix. The first mode information may be encoded using a predetermined first mode flag. For example, the first mode information may be encoded using scaling_list_copy_mode_flag. In this case, when a first value (e.g., 0) of scaling_list_copy_mode_flag may specify that the quantization matrix for the current block is the same as reference quantization matrix. In contrast, a second value (e.g., 1) of scaling_list_copy_mode_flag may specify that the quantization matrix for the current block is not the same as the reference quantization matrix. When scaling_list_copy_mode_flag is not signaled, scaling_list_copy_mode_flag may be inferred as having a first value.

The second mode information may specify whether the quantization matrix is derived from the reference quantization matrix. The second mode information may be encoded using a predetermined second mode flag only when the quantization matrix for the current block is not the same as the reference quantization matrix. For example, the second mode information may be encoded using scaling_list_pred_mode_flag, only when scaling_list_copy_mode_flag specifying the first mode information has a second value (e.g., 1). In this case, a first value (e.g., 0) of scaling_list_pred_mode_flag may specify that the quantization matrix for the current block is derived from the reference quantization matrix. In contrast, a second value (e.g., 1) of scaling_list_pred_mode_flag may specify that the quantization matrix for the current block is not derived from the reference quantization matrix. When scaling_list_pred_mode_flag has a second value, the value of the quantization matrix for the current block may be explicitly signaled.

The image encoding apparatus may determine whether the quantization matrix for the current block is constructed from the reference quantization matrix, based on the quantization mode information encoded in step S1710 (S1720). For example, the image encoding apparatus may determine whether the quantization matrix for the current block is constructed to be the same as the reference quantization matrix, based on the first mode information. Alternatively, the image encoding apparatus may determine whether the quantization matrix for the current block is derived from the reference quantization matrix, based on the second mode information.

When the quantization matrix for the current block is constructed from the reference quantization matrix ('YES' of S1720), the image encoding apparatus may encode reference quantization matrix identification information for specifying the reference quantization matrix (S1730). The reference quantization matrix identification information may be encoded using a predetermined syntax element, for example, scaling_list_pred_matrix_id_delta. When scaling_list_pred_matrix_id_delta has a first value (e.g., 0), the quantization matrix for the current block may be derived from a predetermined default matrix. All one or more quantization matrix coefficients included in the default matrix may have the same value. In an example, the values of the quantization matrix coefficients included in the default matrix may be 16. In contrast, when scaling_list_pred_matrix_id_delta has a value (e.g., 1, 2, 3, etc.) other than the first value, the quantization matrix for the current block may be derived from the reference quantization matrix specified based on scaling_list_pred_matrix_id_delta. For example, the reference quantization matrix may be specified based on scaling_list_pred_matrix_id_delta as shown in Equation 1 below.

$$refMatrixId = matrixID - scaling\_list\_pred\_matrix\_id\_delta[sizeId][matrixId]*(sizeId==6?3:1) \quad \text{[Equation 1]}$$

In Equation 1, refMatrixId may denote an identifier of the reference quantization matrix, and matrixID may denote an identifier of the quantization matrix for the current block as described above with reference to FIG. 16. In addition, sizeId may denote the size of the quantization matrix for the current block as shown above with reference to FIGS. 15 and 16.

Based on the identifier refMatrixId obtained by Equation 1, the quantization matrix for the current block ScalingList may be derived as shown in Equation 2.

$$ScalingList[SizeId][matrixId][i] = ScalingList[SizeId][refMatrixId][i] \text{ with } i=0 \ldots \text{Min}(63,(1<<(sizeId<<1))-1) \quad \text{[Equation 2]}$$

In Equation 2, i denotes each element of the quantization matrix ScalingList for the current block, and i may have the smallest value of 63 and $(1<<(sizeId<<1))-1$ as a maximum value.

When the quantization matrix for the current block is not constructed from the reference quantization matrix ('NO' of S1720), the value of the quantization matrix for the current block may be encoded (S1740).

The value of the quantization matrix for the current block may be encoded using predetermined syntax elements. For example, the value of the quantization matrix for the current block may be encoded using scaling_list_dc_coef_minus8 specifying the scaling factor of the quantization matrix for the current block and scaling_list_delta_coef specifying a difference between an (i−1)-th quantization matrix coefficient and an i-th quantization matrix coefficient in the quantization matrix.

In addition, the value of the quantization matrix for the current block may be encoded according to a predetermined scan method. For example, one or more quantization matrix coefficients in the quantization matrix for the current block may be sequentially encoded according to a diagonal scan order.

An example of syntax for performing the encoding method of the quantization matrix described above with reference to FIG. 17 is shown in FIG. 18.

Referring to FIG. 18, based on FIG. 16, quantization matrices (e.g., matrixId=0 to matrixId=5) having a size of 2×2 or more may be encoded using scaling_list_data syntax (1810). In addition, all quantization matrices except for a quantization matrix (e.g., sizeId=1 && matrixId %3=0) having a size of 2×2 for the luma component of the current block or a quantization matrix (e.g., sizeId=6 && matrixId %3!=0) having a size of 64×64 for the chroma component of the current block may be encoded scaling_list_data syntax (1820).

As a result, a quantization matrix (e.g., matrixId=1, 2, 4 or 5) having a size of 2×2 for the chroma component (e.g., matrixId %3!=0) of the current block may be encoded by scaling_list_data syntax. However, as described above, in a dual tree structure, a 2×2 chroma block is prohibited through partitioning restriction, the encoding process of the 2×2 quantization matrix may be unnecessary. In addition, when a quantization matrix having a small size such as 2×2 is encoded, signaling overhead may increase.

In order to solve such a problem, the encoding method of the quantization matrix according to an embodiment of the present disclosure may be performed only with respect to a quantization matrix having a size greater than 2×2. That is, the encoding process of the quantization matrix having a sizeId value of 0 or 1 (that is, having a size of 2×2 or less) described above with reference to FIGS. 15 and 16 may be skipped.

FIG. 19 is a view illustrating an example of a quantization matrix for a current block according to an embodiment of the present disclosure.

Referring to FIG. 19, the image encoding apparatus may construct first to sixth quantization matrices (matrixId=0 to matrixId=5) having various sizes sizeId, based on a prediction mode CuPredMode of the current block and a color component cIdx.

Specifically, for a luma component (cIdx=0)(e.g., Y) in the current block encoded using an intra prediction mode CuPredMode=MODE_INTRA, a first quantization matrix (matrixId=0) may be constructed. In addition, for a first chroma component (cIdx=1)(e.g., Cb) in the current block encoded using an intra prediction mode, a second quantization matrix (matrixId=1) may be constructed. In addition, for a second chroma component (cIdx=2)(e.g., Cr) in the current block encoded using an intra prediction mode, a third quantization matrix (matrixId=2) may be constructed. In addition, for a luma component (cIdx=0) in the current block encoded using an inter prediction mode or an inter block copy (IBC) mode (CuPredMode=MODE INTER or MODE IBC), a fourth quantization matrix (matrixId=3) may be constructed. In addition, for a first chroma block (cIdx=1) in the current block encoded using an inter prediction mode or an IBC mode, a fifth quantization matrix (matrixId=4) may be constructed. In addition, for a second chroma component (cIdx=2) in the current block encoded using an inter prediction mode or an IBC mode, a sixth quantization matrix (matrixId=5) may be constructed.

The size of each of the first to sixth quantization matrices (matrixId=0 to matrixId=5) may be equal to or greater than 4×4 and equal to or less than 64×64 (that is, 1≤sizeId≤6). That is, unlike the example of FIG. 16, a quantization matrix having a size of 2×2 (e.g., sizeId=1) may not be constructed.

An example of syntax for performing the encoding method of the quantization matrix described with reference to FIG. 19 is shown in FIG. 20.

Referring to FIG. 20, based on the example of FIG. 19, quantization matrices (e.g., matrixId=0 to matrixId=5) having a size of 4×4 or more (e.g. sizeId≥2) may be encoded using scaling_list_data syntax (2010). In addition, all quantization matrices except for a quantization matrix (e.g., sizeId=6 && matrixId %3!=0) having a size of 64×64 for the chroma component of the current block may be encoded using scaling_list_data syntax (2020).

As a result, a quantization matrix having a size of 2×2 (e.g., sizeId=1) for a luma component (e.g., matrixId %3=0) of the current block may not be encoded by scaling_list_data syntax. In addition, a quantization matrix having a size of 2×2 (e.g., sizeId=1) for a chroma component (e.g., matrixId %3!=0) of the current block encoded using an intra prediction mode (e.g., CuPredMode=MODE_INTRA) may not be encoded by scaling_list_data syntax.

That is, unlike the scaling_list_data syntax described above with reference to FIG. 18, according to the scaling_list_data syntax of FIG. 20, since a quantization matrix (e.g., matrixId=1, 2, 4 or 5) having a size of 2×2 (e.g., sizeId=1) is not encoded, by skipping an unnecessary encoding process, it is possible to suppress increase of signaling overhead and to improve encoding efficiency.

Hereinafter, a method of decoding a quantization matrix will be described in detail.

Figure 21:
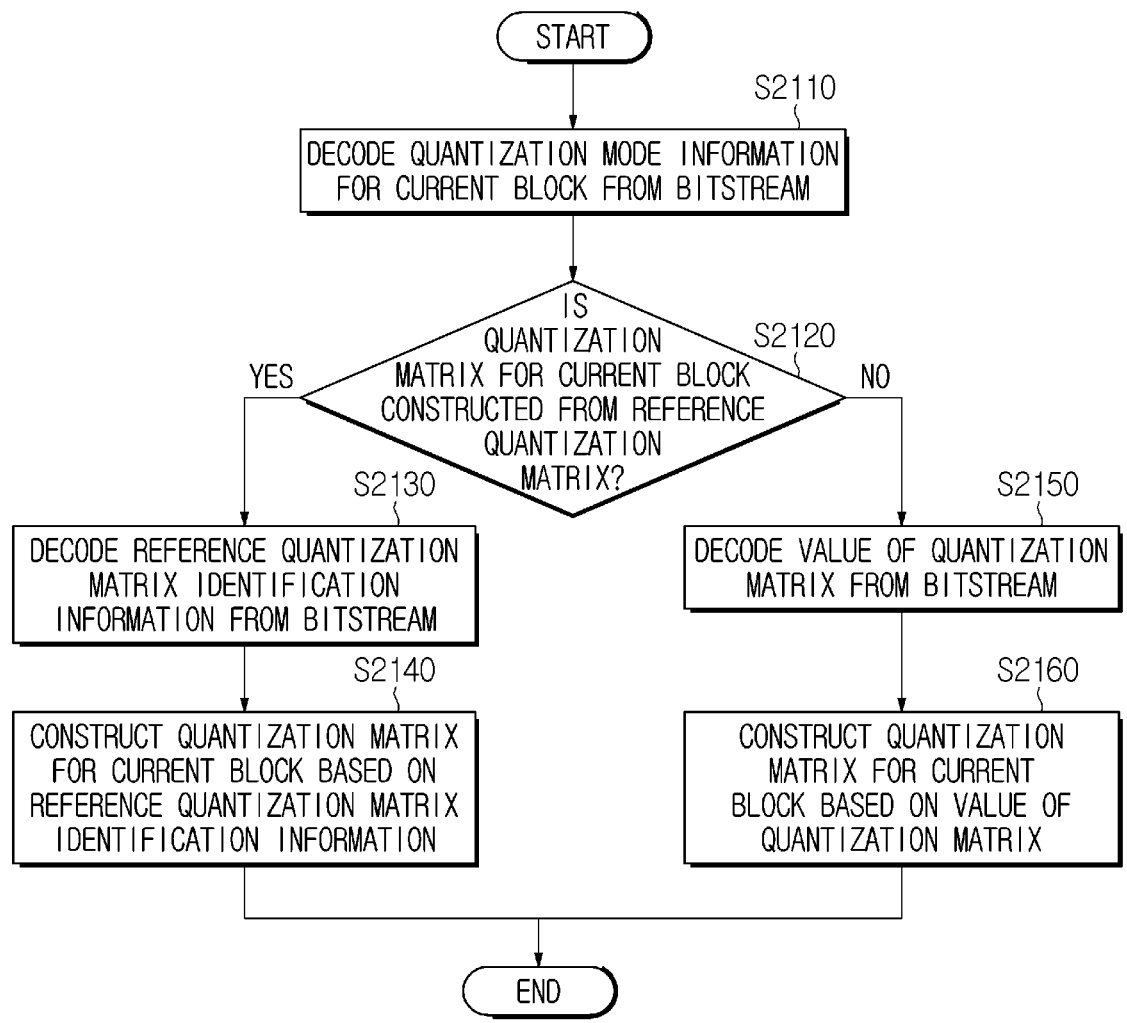
FIG. 21 is a flowchart illustrating a method of decoding a quantization matrix according to an embodiment of the present disclosure.

FIG. 21 is a flowchart illustrating a method of decoding a quantization matrix according to an embodiment of the present disclosure. The decoding method of FIG. 21 may be performed by the image decoding apparatus of FIG. 3. Specifically, steps S2110 to S2160 may be performed by the dequantization unit 220.

Steps S2110 and S2120 of FIG. 21 may correspond to steps S1710 and S1720 of FIG. 17, respectively. In addition, steps S2130 and S2140 may correspond to step S1730 of FIG. 17. In addition, steps S2150 and S2160 may correspond to step S1740 of FIG. 17. Accordingly, a repeated description of FIG. 17 will be omitted or simplified.

Referring to FIG. 21, the image decoding apparatus may decode, from a bitstream, quantization mode information of a method of constructing the quantization matrix for the current block (S2110).

In an example, the quantization mode information may include first mode information specifying whether the quantization matrix is constructed based on the reference quantization matrix. The first mode information may be obtained by decoding a predetermined flag (e.g., scaling_list_pred_mode_flag).

In another example, the quantization mode information may include first mode information and second mode information. The first mode information may specify whether the quantization matrix for the current block is the same as the reference quantization matrix. The first mode information may be obtained by decoding a predetermined first mode flag (e.g., scaling_list_copy_mode_flag). The second mode information may specify whether the quantization matrix for the current block is derived from the reference quantization matrix. The second mode information may be signaled through the bitstream only when the quantization matrix for the current block is not constructed to be the same as the reference quantization matrix (e.g., scaling_list_copy_mode_flag=1). The second mode information may be obtained by decoding a predetermined second mode flag (e.g., scaling_list_pred_mode_flag).

The image decoding apparatus may determine whether the quantization matrix for the current block is constructed from the reference quantization matrix, based on the quantization mode information obtained in step S2110 (S2120).

In an example, when scaling_list_pred_mode_flag, which is the first mode information, has a first value (e.g., 0), the quantization matrix for the current block may be constructed to be the same as the reference quantization matrix.

In another example, when scaling_list_copy_mode_flag, which is the first mode information, has a first value (e.g., 0), the quantization matrix for the current block may be constructed to be the same as the reference quantization matrix. Alternatively, when scaling_list_copy_mode_flag which is the first mode information has a second value (e.g., 1) and scaling_list_pred_mode_flag, which is the second mode information, has a first value (e.g., 0), the quantization matrix for the current block may be derived from the reference quantization matrix.

When the quantization matrix for the current block is constructed from the reference quantization matrix ('YES' of S2120), the image decoding apparatus may decode, from the bitstream, reference quantization matrix identification information for specifying the reference quantization matrix (S2130). The reference quantization matrix identification information may be signaled using a predetermined syntax element, for example, scaling_list_pred_matrix_id_delta.

The image decoding apparatus may construct the quantization matrix for the current block based on the reference quantization matrix identification information obtained in step S2130 (S2140). For example, when scaling_list_pred_matrix_id_delta has a first value (e.g., 0), the quantization matrix for the current block may be derived from a predetermined default matrix. All one or more quantization matrix coefficients included in the default matrix may have the same value. In an example, the values of the quantization matrix coefficients included in the default matrix may be 16. In contrast, when scaling_list_pred_matrix_id_delta has a value (e.g., 1, 2, 3, etc.) other than the first value, the quantization matrix for the current block may be derived from the reference quantization matrix specified based on scaling_list_pred_matrix_id_delta, as described above with reference to Equation 1 and Equation 2.

When the quantization matrix for the current block is not constructed from the reference quantization matrix ('NO' of S2120), the image decoding apparatus may decode, from the bitstream, the value of the quantization matrix for the current block (S2150). The value of the quantization matrix for the current block may be obtained by decoding predetermined syntax elements according to a predetermined scan method (e.g., diagonal scan). For example, the image decoding apparatus may obtain the value of the quantization matrix, by decoding scaling_list_dc_coef_minus8 specifying the scaling factor of the quantization matrix for the current block and scaling_list_delta_coef specifying a difference between an (i−1)-th quantization matrix coefficient and an i-th quantization matrix coefficient in the quantization matrix.

The image decoding apparatus may construct the quantization matrix for the current block based on the value of the quantization matrix obtained in step S2150 (S2160).

As described above, the decoding method of the quantization matrix of FIG. 21 may be performed using the syntax (e.g., scaling_list_data) described above with reference to FIGS. 19 and 20. In this case, a quantization matrix having a size of 2×2 or less (e.g., sizeId≤1) may not be decoded. As a result, since an unnecessary decoding process for a 2×2 chroma block which is not allowed in the dual tree structure may be skipped, it is possible to improve decoding efficiency.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 22:
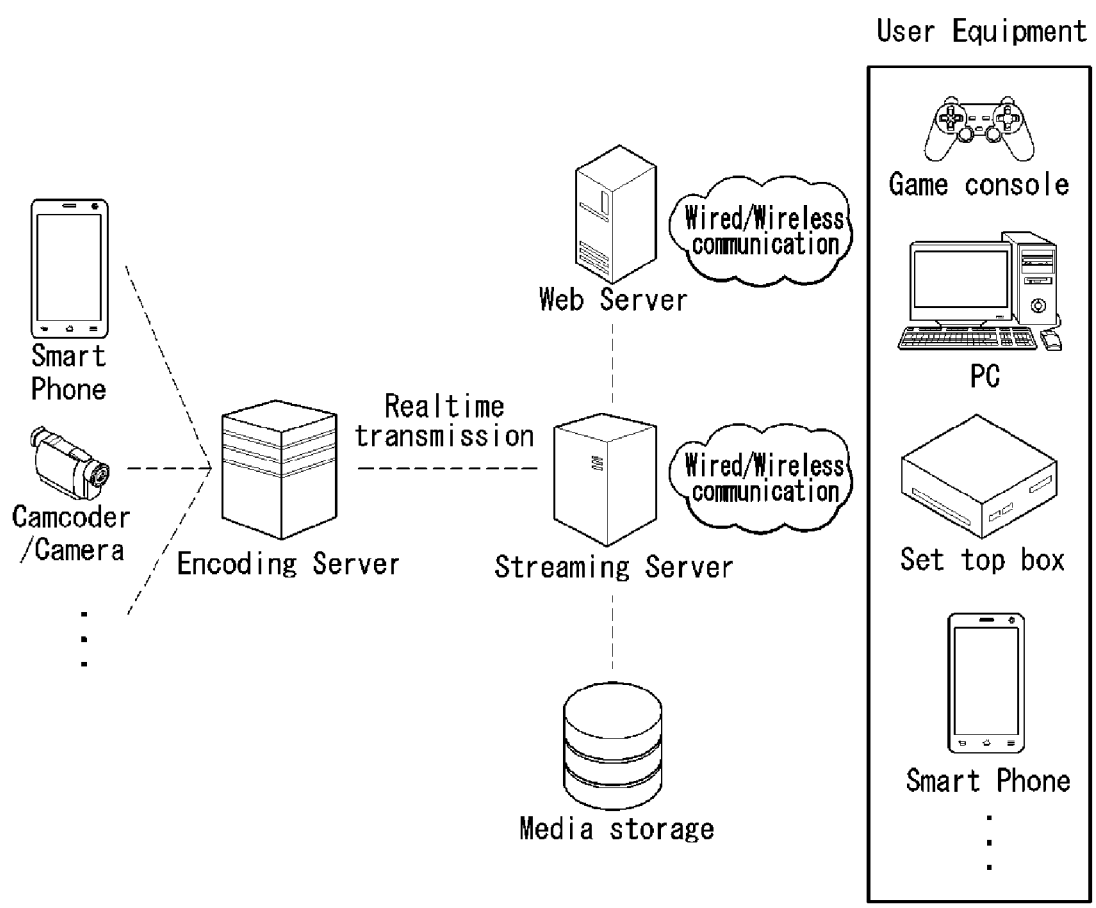
FIG. 22 is a view showing a content streaming system, to which an embodiment of the present disclosure is applicable.

FIG. 22 is a view showing a contents streaming system, to which an embodiment of the present disclosure is applicable.

As shown in FIG. 22, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining quantization mode information for a current block from a bitstream;
determining whether a quantization matrix for the current block is constructed from a reference quantization matrix, based on the quantization mode information; and
constructing the quantization matrix for the current block, based on a result of the determination,
wherein, based on the quantization matrix for the current block being constructed from the reference quantization matrix, the quantization matrix for the current block is constructed based on identification information of the reference quantization matrix,
wherein, based on the quantization matrix for the current block not being constructed from the reference quantization matrix, the quantization matrix for the current block is constructed based on a value of the quantization matrix obtained from the bitstream,
wherein, based on the current block being an intra-predicted chroma block, the quantization matrix for the current block is constructed only when a size of the current block is greater than 2×2, wherein, the quantization mode information includes a first mode flag specifying whether the quantization matrix for the current block is constructed to be same as the reference quantization matrix and a second mode flag specifying whether the quantization matrix for the current block is derived from the reference quantization matrix, wherein the second mode flag is included in the quantization matrix information based on the quantization matrix for the current block not being constructed to be the same as the reference quantization matrix, and wherein, a second value of the second mode flag specifies values of the quantization matrix for the current block is explicitly signalled.

2. The image decoding method of claim 1, wherein, based on the first mode flag having a first value, the quantization matrix for the current block is constructed based on the identification information of the reference quantization matrix.

3. The image decoding method of claim 1, wherein, based on the second mode flag having a first value, the quantization matrix for the current block is constructed based on the identification information of the reference quantization matrix.

4. The image decoding method of claim 1, wherein, based on the identification information of the reference quantization matrix having a first value, the quantization matrix for the current block is constructed as a predetermined default matrix.

5. The image decoding method of claim 4, wherein one or more quantization matrix coefficients included in the default matrix have a same value.

6. The image decoding method of claim 5, wherein all values of the quantization matrix coefficients included in the default matrix are 16.

7. The image decoding method of claim 1, wherein the value of the quantization matrix is obtained by, from the bitstream, decoding a first syntax element specifying a scaling factor of the quantization matrix for the current block and a second syntax element specifying a difference between quantization matrix coefficients in the quantization matrix.

8. The image decoding method of claim 1, wherein the quantization matrix for the current block has a configuration varying according to a prediction mode for the current block and a color component.

9. An image encoding method performed by an image encoding apparatus, the image encoding method comprising:

determining whether a quantization matrix for a current block is constructed from a reference quantization matrix, a result of determination being encoded using quantization mode information; and encoding information on the quantization matrix for the current block based on the result of determination, wherein, based on the quantization matrix for the current block being constructed from the reference quantization matrix, identification information of the reference quantization matrix is encoded, wherein, based on the quantization matrix for the current block not being constructed from the reference quantization matrix, a value of the quantization matrix for the current block is encoded, wherein, based on the current block being an intra-predicted chroma block, the quantization matrix for the current block is constructed only when a size of the current block is greater than 2×2, wherein, the quantization mode information includes a first mode flag specifying whether the quantization matrix for the current block is constructed to be same as the reference quantization matrix and a second mode flag specifying whether the quantization matrix for the current block is derived from the reference quantization matrix, wherein the second mode flag is included in the quantization matrix information based on the quantization matrix for the current block not being constructed to be the same as the reference quantization matrix, and wherein, a second value of the second mode flag specifies values of the quantization matrix for the current block is explicitly signalled.

10. A method of transmitting a bitstream generated by an image encoding method, the image encoding method comprising:

determining whether a quantization matrix for a current block is constructed from a reference quantization matrix, a result of determination being encoded using quantization mode information; and encoding information on the quantization matrix for the current block based on the result of determination, wherein, based on the quantization matrix for the current block being constructed from the reference quantization matrix, identification information of the reference quantization matrix is encoded, wherein, based on the quantization matrix for the current block not being constructed from the reference quantization matrix, a value of the quantization matrix for the current block is encoded, wherein, based on the current block being an intra-predicted chroma block, the quantization matrix for the current block is constructed only when a size of the current block is greater than 2×2, wherein, the quantization mode information includes a first mode flag specifying whether the quantization matrix for the current block is constructed to be same as the reference quantization matrix and a second mode flag specifying whether the quantization matrix for the current block is derived from the reference quantization matrix, wherein the second mode flag is included in the quantization matrix information based on the quantization matrix for the current block not being constructed to be the same as the reference quantization matrix, and wherein, a second value of the second mode flag specifies values of the quantization matrix for the current block is explicitly signalled.

* * * * *